(No Model.)

C. D. P. GIBSON.
STORAGE BATTERY PLATE.

No. 397,796. Patented Feb. 12, 1889.

Witnesses
Geo. W. Breck
Edward Thorpe

Inventor,
Chas. D. P. Gibson
By his Attorneys
Pope Edgcomb & Ferry

United States Patent Office.

CHARLES D. P. GIBSON, OF NEW YORK, N. Y.

STORAGE-BATTERY PLATE.

SPECIFICATION forming part of Letters Patent No. 397,796, dated February 12, 1889.

Application filed October 18, 1888. Serial No. 288,423. (No model.)

*To all whom it may concern:*

Be it known that I, CHARLES D. P. GIBSON, a citizen of the United States, residing in New York, in the county and State of New York, have invented certain new and useful Improvements in Storage-Battery Plates, of which the following is a specification.

The invention relates to the construction of storage-batteries or accumulators; and it consists in a novel form of supporting-plates or electrodes, designed to be of simple construction, which shall reliably unite the plate and the active material together, while perfectly exposing both to the action of the electrolytic fluid.

The invention consists in striking out from the surface of the sheet or plate of lead which forms the electrode or in casting thereon raised loops which form continuous sections of the sheet or plate, and as the active material when applied extends under these loops or raised sections it becomes thereby firmly united with the metallic plate. The plate is preferably prepared with a raised rim about its edge of a height approximately equal to the thickness of the active material to be applied, and the loops are made of about the same height as the rim. It will be seen that when the loops are struck out from the material of the plate, which may be done in a very simple and inexpensive manner by proper tools, a hole is made through the body of the plate under each loop. The loop may be curved in shape or rectangular, or of any desired shape. When the active material is laid upon the plate, it forms a continuous body extending under all the loops, and the upper portions of the loops, which are even with the surface of the active material, form points of contact for the electrolytic fluid throughout the entire surface of the plate.

Figure 1:
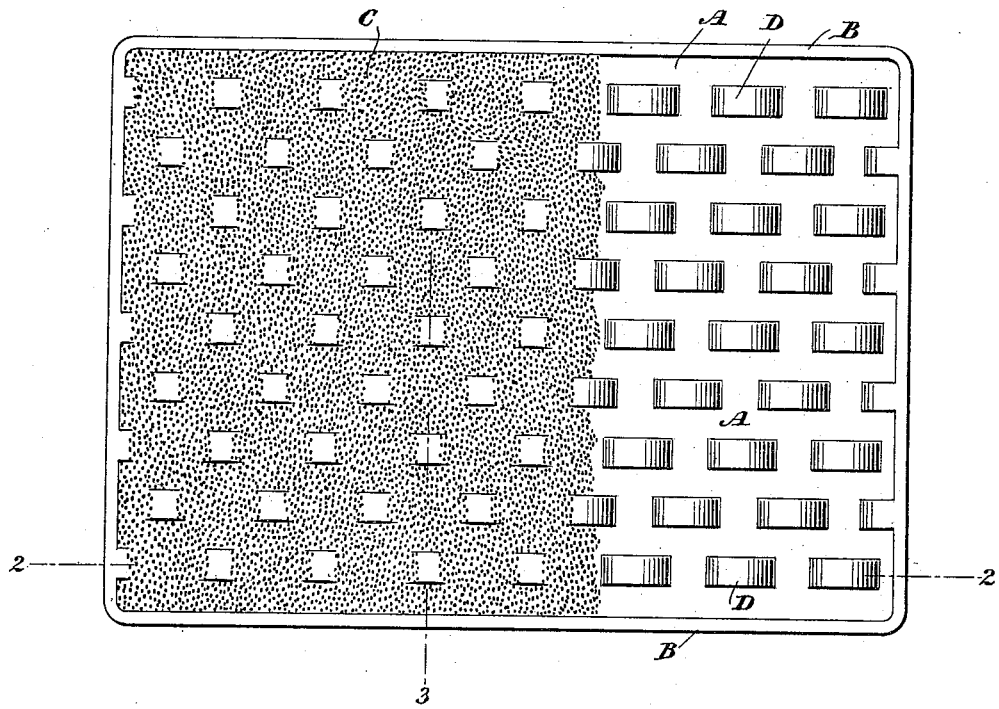
Figure 2:
Figure 3:
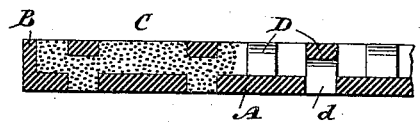

In the accompanying drawings, Figure 1 is an elevation, and Figs. 2 and 3 are transverse sections, of a battery-plate embodying the features of the invention.

Referring to the figures, A represents a sheet of metal, preferably lead. From its surface the loops D are struck up to a height approximately equal to that of the rim B. These loops form continuous sections of the metallic plate, and may be said to tie the active material to the body of the plate. The loops are preferably made in alternating lines, and as some of the end loops extend to the rim and become attached thereto they strengthen the plate.

As shown in Figs. 2 and 3, holes *d* are made in the plate by striking up the material of the loops, and the active material C extends through the holes and fills them up.

The plate possesses great strength, is easily and cheaply made, the active material may be applied in an expeditious and simple manner, and as the upper parts of the loops extend even with the surface of the active material, as shown in Fig. 1, the metallic portions of the plate are brought into contact with the electrolytic fluid throughout the whole surface of the plate.

While the loops shown in the drawings are curved in shape, it is plain that they may be made rectangular or of any other desirable form.

Loops may be struck up from both sides of the plates, if desired.

I claim as my invention—

1. A storage-battery plate consisting of a sheet of metal having portions thereof raised above its surface in the form of loops.

2. A storage-battery plate consisting of a sheet of metal having loops raised from its surface and active material covering the surface of said plate and extending under the loops.

3. The combination of the plate A, having the rim B, the loops D, and the active material C, covering the plate and secured thereto by extending under said loops, as described.

In testimony whereof I have hereunto subscribed my name this 17th day of October, A. D. 1888.

CHAS. D. P. GIBSON.

Witnesses:
GEO. M. PHELPS,
CAROLINE E. DAVIDSON.